United States Patent [19]

Hefner, Jr.

[11] Patent Number: 4,555,553

[45] Date of Patent: Nov. 26, 1985

[54] HYDROXYAROMATIC OLIGOMERS OF A MIXED CYANATE AND AROMATIC POLYAMINE AND EPOXY RESINS THEREOF

[75] Inventor: Robert E. Hefner, Jr., Lake Jackson, Tex.

[73] Assignee: The Dow Chemical Company, Midland, Mich.

[21] Appl. No.: 702,699

[22] Filed: Feb. 15, 1985

[51] Int. Cl.$^4$ .................. C08G 59/32; C08G 59/26; C08G 59/04

[52] U.S. Cl. .................................. 525/523; 525/533; 525/534; 528/96; 528/97; 528/98; 528/99; 528/120; 528/121; 528/128; 528/150; 528/211

[58] Field of Search ............... 525/523, 533, 534; 528/96, 97, 98, 99, 120, 121, 128, 150, 211

[56] References Cited

U.S. PATENT DOCUMENTS

| | | | |
|---|---|---|---|
| 2,893,978 | 7/1959 | Cooke | 528/96 X |
| 3,978,028 | 8/1976 | Sundermann et al. | 528/211 |
| 4,042,567 | 8/1977 | Sundermann | 528/211 |
| 4,049,630 | 9/1977 | Sundermann et al. | 528/211 |
| 4,195,132 | 3/1980 | Sundermann et al. | 528/211 X |
| 4,487,915 | 12/1984 | Hefner, Jr. | 528/96 |
| 4,489,202 | 12/1984 | Hefner, Jr. | 528/95 |

Primary Examiner—Earl Nielsen
Attorney, Agent, or Firm—J. G. Carter

[57] ABSTRACT

Novel hydroxyaromatic oligomers are prepared by the co-oligomerization reaction of a mixed cyanate of a polyphenol with an aromatic polyamine. These oligomers are useful in preparing epoxy resins therefrom.

11 Claims, No Drawings

HYDROXYAROMATIC OLIGOMERS OF A MIXED CYANATE AND AROMATIC POLYAMINE AND EPOXY RESINS THEREOF

BACKGROUND OF THE INVENTION

The present invention provides novel hydroxyaromatic oligomers prepared from co-oligomerization reaction of a mixed cyanate of a polyphenol with an aromatic polyamine, as well as epoxy resin compositions prepared from said oligomers.

Preparation of hydroxyaromatic oligomers containing triazine groups and polyepoxides thereof is taught by R. E. Hefner, Jr., in U.S. Pat. No. 4,489,202 issued Dec. 18, 1984. The process disclosed therein uses an easily prepared mixed cyanate of a diphenol or polyphenol. More specifically, the process disclosed comprises reacting at least one material having an average of more than one aromatic hydroxyl group per molecule with at least 0.01 but not more than 0.95 moles of cyanogen halide or mixture of cyanogen halides per aromatic hydroxyl group at a temperature and time sufficient to essentially complete the reaction and thereafter recovering the resultant cyanate mixture; trimerizing the resultant cyanate mixture in the presence of a suitable trimerization catalyst at a temperature and time to essentially complete the reaction, epoxidizing the resultant trimerized product in a conventional manner by reaction with an epihalohydrin with subsequent dehydrohalogenation with a basic-acting material and finally recovering the resultant triazine functional glycidyl ether product. Excellent control over the molecular weight and content of triazine groups is provided by this process. The resultant epoxy resin compositions possess unusually high thermal stability as well as excellent overall physical and mechanical properties.

Preparation of hydroxyaromatic oligomers containing triazine and oxazoline groups and polyepoxides thereof is taught by R. E. Hefner, Jr., in U.S. Pat. No. 4,487,915 issued Dec. 11, 1984. The process disclosed therein uses the aforementioned mixed cyanate of a diphenol or polyphenol. Co-oligomerization of this cyanate mixture with an epoxy resin, such as a diglycidyl ether of bisphenol A, provides hydroxyaromatic oligomers containing both triazine and oxazoline groups. Oligomers prepared from co-oligomerization of the mixed cyanate of a diphenol with an epoxy resin using mole ratios of epoxy groups to cyanate groups of about 1 to 10 to about 1 to 40 or more are disclosed for the process described. The oligomers, and unreacted diphenol, if any, are then epoxidized using methods well known in the art. The resultant epoxy resin compositions possess excellent thermal stability as well as enhanced mechanical properties.

Preparation of advanced epoxy resin compositions containing triazine groups or both triazine and oxazoline groups are taught by R. E. Hefner, Jr., in allowed application Ser. No. 582,415 filed Feb. 22, 1984. In the process disclosed therein, the respective triazine-containing or triazine-containing and oxazoline-containing hydroxyaromatic oligomers are reacted with an epoxy resin. The application discloses advanced epoxy resins as well as cured compositions thereof.

The hydroxyaromatic oligomers of the present invention contain both triazine groups and

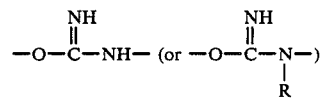

linkages, otherwise called "imino carbamate". The oligomers are prepared by co-oligomerization of a mixed cyanate of a polyphenol with an aromatic polyamine in the process of the present invention. In the process, the polyphenol, such as 4,4'-isopropylidenediphenol (Bisphenol A) is reacted with less than a stoichiometric equivalent of a cyanogen halide in the presence of an alkaline agent, such as triethylamine. This provides a mixture of monocyanate, dicyanate and, optionally, unreacted diphenol. Co-oligomerization of this mixture with the desired amount of an aromatic polyamine, such as methylenedianiline, provides hydroxyaromatic oligomers containing both triazine groups and imino carbamate linkages. Epoxidation of the oligomers and unreacted diphenol, if any, using methods well known in the art provide the epoxy resin compositions of this invention. Advancement reaction of the oligomers and unreacted diphenol, if any, and an epoxy resin using methods well known in the art provide advanced epoxy resin compositions of this invention.

Although included within the scope of this invention, oligomers prepared from co-oligomerization of the mixed cyanate of a diphenol with an aromatic diamine wherein the mole ratio of amine groups to cyanate groups is less than about 1 to 5, respectively, are generally either reactive with or insoluble in the solvent(s) and/or reactant(s) useful in epoxidation reactions but are useful as thermoset resins. Oligomers prepared from co-oligomerization of the mixed cyanate of a diphenol with an aromatic diamine wherein the mole ratios of amine groups to cyanate groups are about 1 to 5 to about 1 to 40 are most preferred precursors to the epoxy resins of the present invention.

Unreacted diphenol (polyphenol), which is preferably present as a component of the oligomers, is converted to the corresponding diglycidyl ether during the epoxidation of the hydroxyaromatic oligomers. This improves overall processability of the epoxy resin. If desired, extra diphenol can be added prior to epoxidation to increase the diphenol diglycidyl ether content of the finished epoxy resin product. Likewise, extra dicyanate may be added to the cyanate mixture prior to co-oligomerization.

SUMMARY OF THE INVENTION

The present invention pertains to hydroxyaromatic oligomer compositions containing both triazine groups and imino carbamate linkages prepared by
(I) reacting at a temperature and time sufficient to essentially complete the reaction
  (A) at least one material having an average of more than one aromatic hydroxyl group per molecule with
  (B) at least 0.01 but not more than 0.95, preferably from about 0.05 to about 0.55 moles of at least one cyanogen halide per aromatic hydroxyl group in the presence of
  (C) from about 0.01 to about 1.1, preferably from about 0.05 to about 0.6 moles of a suitable base per aromatic hydroxyl group and thereafter recovering the resultant cyanate-containing mixture; and (II) co-oligomerizing the product resulting from (I) with (D) an aromatic polyamine in an amount which provides a mole ratio of amine groups to cyanate groups of from about 0.01:1 to about 1:1, preferably from about 0.03:1 to about 0.20:1 optionally in the presence of (E) a suitable co-oligomerization catalyst and at a temperature and time to essentially complete the co-oligomerization reaction.

Another aspect of the present invention pertains to epoxy resin compositions prepared by reacting an epihalohydrin with the above prepared hydroxyaromatic oligomer composition and subsequently dehydrohalogenating the resultant halohydrin ether and thereafter recovering the resultant glycidyl ether product.

Another aspect of the present invention pertains to advanced epoxy resin compositions prepared by reacting (A) at least one hydroxyaromatic oligomer containing at least one triazine group and at least one imino carbamate linkage with (B) at least one material having an average of more than one 1,2-epoxy group per molecule;

wherein components (A) and (B) are employed in proportions which provide a ratio of hydroxyl groups to epoxy groups of from about 0.1:1 to about 1:1, preferably from about 0.1:1 to about 0.5:1.

Another aspect of the present invention pertains to the product resulting from curing the aforementioned epoxy resins or advanced epoxy resins with a curing quantity of a suitable curing agent and/or catalyst or mixture of curing agents and/or catalysts.

DETAILED DESCRIPTION OF THE INVENTION

Suitable materials having an average of more than one aromatic hydroxyl group per molecule which can be employed to prepare the cyanate mixture precursor to the triazine functional oligomers containing imino carbamate linkages include, for example, those represented by the formulas:

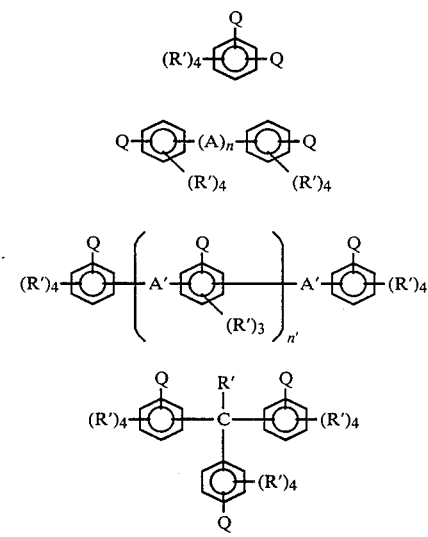

wherein Q is an —OH group; each A is independently a divalent hydrocarbon group having from 1 to about 12, preferably from about 1 to about 6 carbon atoms,

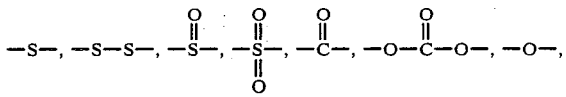

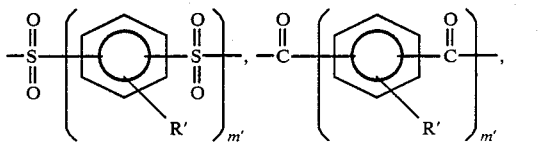

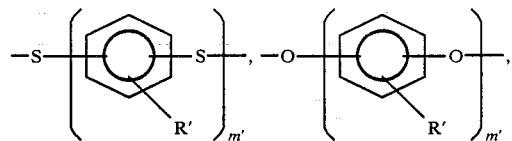

and the like; each A' is independently a divalent hydrocarbon group having from 1 to about 3, preferably 1, carbon atoms or a

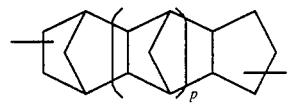

group; each R' is independently hydrogen or a hydrocarbyl or hydrocarbyloxy group having from 1 to about 6 carbon atoms or a halogen, preferably chlorine or bromine; m' has a value from 1 to about 100, preferably from 1 to about 10; n has a value of zero or 1; N' has a value from about 0.001 to about 6; and p has a value of from zero to about 10, preferably from zero to 3.

Particularly suitable aromatic hydroxyl-containing compounds include, for example, o-, m- and p-dihydroxybenzene, 2-tert-butyl hydroquinone, 2,4-dimethyl resorcinol, 2,5-di-tert-butyl hydroquinone, tetramethyl hydroquinone, 2,4,6-trimethyl resorcinol, 4-chlororesorcinol, 4-tert-butyl pyrocatechol, 1,1-bis(4-hydroxyphenyl)ethane, 2,2-bis(4-hydroxyphenyl)propane, 2,2-bis(4-hydroxyphenyl)pentane, bis(4,4'-dihydroxyphenyl)methane, 4,4'-dihydroxydiphenyl, 2,2'-dihydroxydiphenyl, 3,3',5,5'-tetramethyl-4,4'-dihydroxydiphenyl, 3,3',5,5'-tetrachloro-4,4'-dihydroxydiphenyl, 3,3',5,5'-tetrachloro-2,2'-dihydroxydiphenyl, 2,2',6,6'-tetrachloro-4,4'-dihydroxydiphenyl, 4,4'-bis((3-hydroxy)phenoxy)diphenyl, 4,4'-bis((4-hydroxy)phenoxy)diphenyl, 2,2'-dihydroxy-1,1'-binaphthyl, and other dihydroxydiphenyls; 4,4'-dihydroxydiphenyl ether, 3,3',5,5'-tetramethyl-4,4'-dihydroxydiphenyl ether, 3,3',5,5'-tetrachloro-4,4'-dihydroxydiphenyl ether, 4,4'-bis(p-hydroxyphenoxy)diphenyl ether, 4,4'-bis(p-hydroxyphenyl isopropyl)diphenyl ether, 4,4'-bis(p-hydroxyphenoxy)benzene, 4,4'-bis(p-hydroxyphenoxy)diphenyl ether, 4,4'-bis(4-(4-hydroxyphenoxy)phenyl sulfone)diphenyl ether, and other dihydroxydiphenyl ethers; 4,4'-dihydroxydiphenyl sulfone, 3,3',5,5'-tetramethyl-4,4'-dihydroxydiphenyl sulfone, 3,3',5,5'-tetrachloro-4,4'-dihydroxydiphenyl sulfone, 4,4'-bis(p-hydroxyphenyl isopropyl)diphenyl sulfone, 4,4'-bis((4-hydroxy)phenoxy)diphenyl sulfone, 4,4'-bis((3-hydroxy)phenoxy)diphenyl sulfone, 4,4'-bis(4-(4-hydroxyphenyl isopropyl)phenoxy)diphenyl sulfone, 4,4'-bis(4-(4-hydroxy)diphenoxy)diphenyl sulfone, and other diphenyl sulfones; 4,4'-dihydroxydiphenyl methane, 4,4'-bis(p-hydroxyphenyl)diphenyl methane, 2,2'-bis(p-hydroxyphenyl)propane, 3,3',5,5'-tetramethyl-2,2'-bis(p-hydroxyphenyl)propane, 3,3',5,5'-tetrachloro-2,2'-bis(p-hydroxyphenyl)propane, 1,1,-bis(p-hydroxyphenyl)cyclohexane, bis-(2-hydroxy-1-naphthyl)methane, 1,2-bis(p-hydroxyphenyl)-1,1,2,2-tetramethyl ethane, 4,4'-dihydroxybenzophenone, 4,4'-bis(4-hydroxy)phenoxybenzophenone, 1,4-bis(p-hydroxyphenyl isopropyl)benzene, phloroglucinol, pyrogallol, 2,2',5,5'-tetrahydroxydiphenyl sulfone, other dihydroxydiphenyl alkanes, tris(hydroxyphenyl)methane, tris(4-hydroxy-2-bromophenyl)methane, other tris(hydroxyphenyl)alkanes, mixtures thereof and the like.

Suitable cyanogen halides which can be employed to prepare the cyanate mixture precursor include, for example, cyanogen chloride, cyanogen bromide, mixtures thereof and the like.

If desired, the method reported in *Organic Synthesis*, Vol. 61, pages 35-67 (1983), published by John Wiley & Sons, may be used to generate the required amount of cyanogen halide in situ, although this is less preferred than using neat cyanogen halide.

Suitable base materials which can be employed to prepare the cyanate mixture precursor include both inorganic bases and tertiary amines, such as, for example, sodium hydroxide, potassium hydroxide, triethylamine, pyridine, lutidine, mixtures thereof and the like. The tertiary amines are most preferred as the base material.

Suitable co-oligomerization catalysts which can optionally although most preferably be employed for conversion of the cyanate mixture and aromatic polyamine mixture to hydroxyaromatic oligomers containing both triazine groups and imino carbamate linkages include, for example, metal salts of carboxylic acids, such as, for example, lead octoate, zinc stearate, zinc acetylacetonate, at concentrations of about 0.001 to 5 percent. Most preferred catalysts are cobalt naphthenate and cobalt octoate, mixtures thereof and the like.

Although the co-oligomerization of the cyanate mixture with an aromatic polyamine provides both triazine groups and imino carbamate linkages in the oligomer product, it is felt that other reactions may also be occurring. For example, minor amounts of phenolic groups may react with cyanate groups to form iminocarbonate linkages.

Suitable aromatic polyamines for co-oligomerization with the cyanate mixture are those represented by formulas I, II, III, and IV wherein Q is an —NH$_2$ group and A, A', R', m', n, n' and p are as hereinbefore defined. Aromatic polyamines wherein Q is an

group and R is a hydrocarbyl group having from 1 to about 10 carbon atoms, a phenyl group or an alkylaryl group may also be used in the co-oligomerization reaction although they are less preferred.

Particularly suitable aromatic amine-containing compounds include, for example, o-, m- and p-diaminobenzene, 2-tert-butyl-1,4-diaminobenzene, 2,4-dimethyl-1,3-diaminobenzene, 2,5-di-tert-butyl-1,4-diaminobenzene, 2,3,5,6-tetramethyl-1,4-diaminobenzene, 2,4,6-trimethyl-1,3-diaminobenzene, 4-chloro-1,3-diaminobenzene, 4-tert-butyl-1,2-diaminobenzene, 1,1-bis(4-aminophenyl)ethane, 2,2-bis(4-aminophenyl)propane, 2,2-bis(4-aminophenyl)pentane, bis(4,4'-diaminophenyl)methane, 4,4'-diaminodiphenyl, 2,2'-diaminodiphenyl, 3,3',5,5'-tetramethyl-4,4'-diaminodiphenyl, 3,3',5,5'-tetrachloro-4,4'-diaminodiphenyl, 3,3',5,5'-tetrachloro-2,2'-diaminodiphenyl, 2,2',6,6'-tetrachloro-4,4'-diaminodiphenyl, 4,4'-bis((3-amino)phenoxy)diphenyl, 4,4'-bis((4-amino)phenoxy)diphenyl, 2,2'-diamino-1,1'-binaphthyl, and other diaminodiphenyls; 4,4'-diaminodiphenyl ether, 3,3',5,5'-tetramethyl-4,4'-diaminodiphenyl ether, 3,3',5,5'-tetrachloro-4,4'-diaminodiphenyl ether, 4,4'-bis(p-aminophenoxy)diphenyl ether, 4,4'-bis(p-aminophenyl isopropyl)diphenyl ether, 4,4'-bis(p-aminophenoxy)benzene, 4,4'-bis(p-aminophenoxy)diphenyl ether, 4,4'-bis(4-(4-aminophenoxy)phenyl sulfone)diphenyl ether, and other diaminodiphenyl ethers; 4,4'-diaminodiphenyl sulfone, 3,3',5,5'-tetramethyl-4,4'-diaminodiphenyl sulfone, 3,3',5,5'-tetrachloro-4,4'-diaminodiphenylsulfone, 4,4'-bis(p-aminophenyl isopropyl)diphenyl sulfone, 4,4'-bis((4-amino)phenoxy)diphenyl sulfone, 4,4'-bis((3-amino)phenoxy)diphenyl sulfone, 4,4'-bis(4 -(4-aminophenylisopropyl)-phenoxy)-diphenyl sulfone, 4,4'-bis(4-(4-amino)diphenoxy)diphenyl sulfone, and other diphenyl sulfones; 4,4'-diaminodiphenyl methane, 4,4'-bis(p-aminophenyl)diphenyl methane, 2,2'-bis(p-aminophenyl)propane, 3,3',5,5'-tetramethyl-2,2'-bis(p-aminophenyl)propane, 3,3',5,5'-tetrachloro-2,2'-bis-(p-aminophenyl)propane, 1,1-bis(p-aminophenyl)cyclohexane, bis-(2-amino-1-naphthyl)methane, 1,2-bis(p-aminophenyl)-1,1,2,2-tetramethylethane, 4,4'-diaminobenzophenone, 4,4'-bis(4-amino)phenoxybenzophenone, 1,4-bis(p-aminophenyl isopropyl)benzene, 2,2',5,5'-tetraaminodiphenyl sulfone, other diaminodiphenyl alkanes, tris(aminophenyl)methane, tris(4-amino-2-bromophenyl)methane, other tris(aminophenyl)alkanes, mixtures thereof and the like.

Reaction to provide the cyanate mixture is usually conducted at a temperature of from about −40° C. to about 60° C., preferably from about −20° C. to about 25° C. for from about 10 minutes (600 s) to about 120 minutes (7200 s), preferably from about 10 minutes (600 s) to about 60 minutes (3600 s).

If desired, the reaction to provide the cyanate mixture can be conducted in the presence of an inert solvent reaction medium. Suitable such solvents include, for example, water, chlorinated hydrocarbons, ketones, mixtures thereof and the like. Most preferred solvents include acetone and methylene chloride.

The co-oligomerization reaction is usually conducted at a temperature of from about 70° C. to about 250° C., preferably from about 70° C. to about 200° C. for a period of from about 15 minutes (900 s) to about 240 minutes (14400 s), preferably from about 30 minutes (1800 s) to about 120 minutes (7200 s). The co-oligomerization reaction is preferably performed in the presence of the aforementioned catalyst(s).

The cyanate mixture and aromatic polyamine are thoroughly blended to provide a homogeneous mixture prior to co-oligomerization reaction. This is accomplished either by grinding or blending the solid cyanate mixture and aromatic polyamine or, preferably, by dispersing or dissolving or slurring said cyanate mixture and aromatic polyamine in an inert solvent followed by devolatilization to remove said solvent. Suitable such inert solvents include, for example, chlorinated hydrocarbons and aromatic hydrocarbons.

Epoxidation of the co-oligomerization product can be performed by the known methods described in *Handbook of Epoxy Resins* by Lee and Neville, McGraw-Hill, (1967) which is incorporated herein by reference. This usually includes reacting the co-oligomerization product (step II) with an epihalohydrin followed by dehydrohalogenation with a basic-acting material such as an alkali metal hydroxide and finally recovering the resultant glycidyl ether product.

Suitable epoxy resins for advancement reaction with the hydroxyaromatic oligomers containing triazine groups and imino carbamate linkages include, for example, those represented by the formulas:

composition of the epoxy resin reactant used; the amount and type of catalyst used, if any; the presence of inert solvent, if any. Typically, the advancement reaction when catalyzed is conducted at a temperature of from about 50° C. to about 200° C., preferably from about 90° C. to about 120° C. for from about 15 minutes (900 s) to about 240 minutes (14400 s), preferably from about 30 minutes (1800 s) to about 90 minutes (5400 s). Advancement reaction times and temperatures are generally longer and higher, respectively, for the non-catalyzed reaction.

Suitable curing agents and/or catalysts for curing and/or preparing epoxy resins and advanced epoxy resins are described in the *Handbook of Epoxy Resins* by Lee and Neville, McGraw-Hill, (1967), as well as U.S. Pat. Nos. 3,477,990; 3,948,855; and 4,366,295 which are incorporated herein by reference.

V.
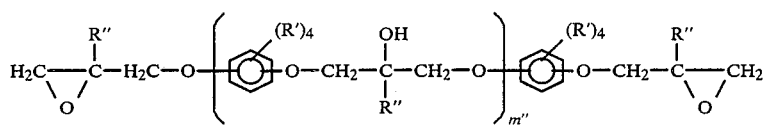

VI.
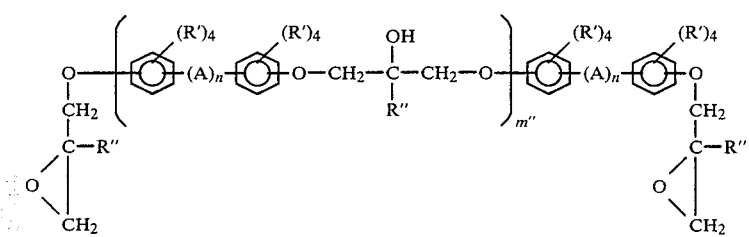

VII.
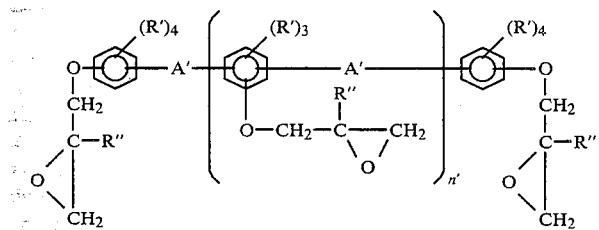

VIII.
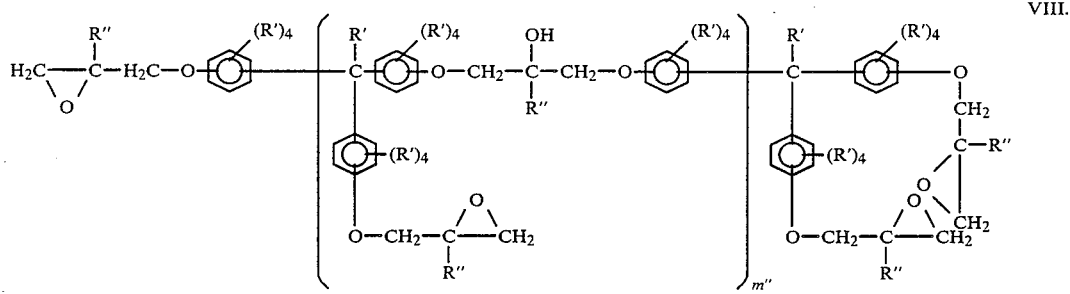

wherein A, A', R', n and n' are as herein before defined, R" is independently hydrogen or a hydrocarbyl group having from 1 to about 3 carbon atoms, and m" has a value from zero to about 40, preferably from 0.1 to about 5.

The advancement reaction is optionally, although preferably, performed in the presence of 0.01 to about 2.0 percent by weight of a suitable catalyst. Suitable catalysts include bases, basic acting materials, acids and the like. Preferred catalysts are the quaternary ammonium salts and phosphonium salts. A most preferred catalyst is benzyltrimethylammonium chloride. Reaction times and temperatures vary depending on the The cured epoxy resins and advanced epoxy resins of this invention possess improvements in one or more physical or mechanical properties such as tensile strength, flexural strength, percent elongation and/or heat distortion temperature. Furthermore, the advancement reaction, allows for incorporation of the hydroxyaromatic oligomers containing both triazine groups and imino carbamate linkages without having to epoxidize (i.e., react with an epihalohydrin followed by dehydrohalogenation) said oligomers.

The epoxy resins and advanced epoxy resins of the present invention can be used to prepare castings, coatings, laminates, composites, encapsulations and the like, and are especially suited for use in applications requiring high mechanical strength. If desired, solvent, fillers, pigments, flow control agents, dyes, fire suppressants and other additives can be employed.

In the preparation of laminates or composites from the compositions of the present invention, suitable substrates include, but are not limited to, woven and non-woven fibers and/or filaments of glass, carbon, graphite, boron, aramid, asbestos, glass and carbon hybrids, combinations thereof and the like.

The following examples are illustrative of the invention, but are not to be construed as to limiting the scope thereof in any manner.

EXAMPLE 1

A. Preparation of Diphenol Cyanate Mixture

Cyanogen bromide (1.65 moles, 174.79 grams) was added to a reactor containing a stirred solution of bisphenol A (3.00 moles, 684.9 grams) in acetone (1200 milliliters) cooled to $-5°$ C. under a nitrogen atmosphere. The stirred solution was allowed to equilibrate at $-5°$ C. Triethylamine (1.50 moles, 151.80 grams) was then added to the reactor over a 24 minute (1440 s) period so as to maintain the reaction temperature at $-5°$ to $-2°$ C. After completion of the triethylamine addition, the reactor was maintained at $-5°$ to $-2°$ C. for an additional 30 minutes (1800 s), followed by addition of the reaction product to chilled water (1.5 gallons, 5.7 liters) with agitation. After 5 minutes (300 s), the water and product mixture was subjected to multiple extractions with three 500 milliliter portions of methylene chloride. The combined methylene chloride extracts were sequentially washed with 500 milliliters of dilute 1% aqueous hydrochloric acid, 800 milliliters of water and then dried over anhydrous sodium sulfate. The dry methylene chloride extract was filtered and solvent removed by rotary evaporation under vacuum. The diphenol cyanate mixture was recovered (705.0 grams) as a light yellow colored solid at room temperature (25° C.). Infrared spectrophotometric analysis demonstrated the presence of the cyanate groups as well as unreacted hydroxyl groups. Liquid chromatographic analysis demonstrated the presence of 56.24 area percent bisphenol A, 38.55 area percent bisphenol A monocyanate, and 5.21 area percent bisphenol A dicyanate.

B. Co-oligomerization of Diphenol Cyanate Mixture and and Aromatic Diamine

A portion of the diphenol cyanate mixture (500.0 grams) from A above, 4,4'-diaminodiphenyl methane (9.40 grams) and methylene chloride solvent (400.0 grams) were mixed on a shaker until a homogeneous mixture was obtained. The mixture was thoroughly blended with 6.0 percent cobalt naphthenate (0.10 percent by weight, 0.51 gram) then placed in a glass tray. The tray was then placed in a vacuum oven and methylene chloride solvent devolatilized from the mixture. The devolatilized mixture was then placed in a forced-air, convection-type oven and maintained for 2.0 hours (7200 s) at 177° C. The hydroxyaromatic co-oligomerization product containing triazine groups and imino carbamate linkages was recovered in quantitative yield as a transparent, light yellow-colored, brittle solid at room temperature (25° C.). Infrared spectrophotometric analysis demonstrated complete disappearance of the cyanate functionality, appearance of the triazine functionality, appearance of absorption attributed to the imino carbamate functionality and the presence of unreacted hydroxyl functionality.

C. Epoxidation of Hydroxyaromatic Co-oligomerization Product Containing Triazine Groups and Imino Carbamates Linkages A portion of the hydroxyaromatic co-oligomerization product from B above (200.00 grams), epichlorohydrin (6.4488 moles, 596.71 grams), isopropanol (35 percent by weight of epichlorohydrin used, 321.31 grams), and water (8 percent by weight of epichlorohydrin used, 51.89 grams) were added to a reactor and stirred under a nitrogen atmosphere at 50° C. until a solution was formed. At that time, dropwise addition of a sodium hydroxide (2.322 moles, 92.86 grams) solution in water (371.44 grams) commenced and was completed over the next 45 minutes (2700 s). During this sodium hydroxide addition, the reaction temperature was allowed to increase to 60° C. and was then held at this temperature. Fifteen minutes (900 s) after the addition of sodium hydroxide solution, a second solution of sodium hydroxide (1.032 mole, 41.27 grams) in water (165.09 grams) was added dropwise to the reactor over the next 20 minutes (1200 s). Fifteen minutes (900 s) later, the reactor was cooled to 40° C., then an initial water wash (400 milliliters) was added to the reactor. The reactor contents were transferred to a separatory funnel. The water wash layer was separated and discarded while the organic layer was added back into the separatory funnel along with a second water wash (600 milliliters). The organic layer was separated then added back into the separatory funnel along with a third water wash (800 milliliters) and additional epichlorohydrin (200 milliliters). The recovered organic layer was stripped of solvents by rotary evaporation at 110° C. for 60 minutes (3600 s) under vacuum. The epoxy resin was recovered (271.60 grams) as a transparent, light yellow-colored liquid at room temperature (25° C.). Epoxide titration revealed the presence of 20.80 percent by weight epoxide.

EXAMPLE 2

Preparation of Cured Epoxy Resin

A portion of the epoxy resin of Example 1-C (240.0 grams) was heated to 100° C., then 4,4'-diaminodiphenyl methane (57.46 grams) was added and thoroughly mixed in. This solution was used to prepare a clear, unfilled one-eighth inch (0.3175 cm) casting for heat distortion temperature (264 psi, 1820 kPa), tensile and flexural strength, flexural modulus, percent elongation and average Barcol hardness (934-1 scale) determinations. The casting was cured for 2 hours (7200 s) at 75° C., followed by post-curing for 2 hours (7200 s) at 125° C. then 2 hours (7200 s) at 177° C. Mechanical properties of tensile (8) and flexural (5) test pieces were determined using an Instron machine with standard test methods (ASTM D-683 and D-790). Heat distortion temperature of clear casting test pieces (2) was determined using an Aminco Plastic Deflection Tester (American Instrument Co.) with standard test methods (ASTM D-648 modified). The results are reported in Table I.

COMPARATIVE EXPERIMENT 1 (U.S. Pat. No. 4,489,202)

A. Preparation of Diphenol Cyanate Mixture

Cyanogen bromide (0.55 moles, 58.26 grams) was added to a reactor containing stirred acetone (175 milliliters) under a nitrogen atmosphere. The cyanogen bromide-acetone solution was cooled to −5° C., then bisphenol A (1.00 mole, 228.30 grams) dissolved in chilled acetone (650 milliliters) was added to the reactor. The stirred solution was allowed to equilibrate at −5° C., then triethylamine (0.50 mole, 50.60 grams) was added to the reactor over a 25 minute (1500 s) period and so as to maintain the reaction temperature at −2 to −5° C. After completion of the triethylamine addition, the reactor was maintained at −2° to 0° C. for an additional 20 minutes (1200 s), followed by addition of the reaction product to chilled water (1 gallon, 3078 ml) with agitation. After 15 minutes (900 s), the water and product mixture was subjected to multiple extractions with methylene chloride. The combined methylene chloride extracts were sequentially washed with dilute hydrochloric acid (5 percent), water, hydrochloric acid, water and then dried over anhydrous magnesium sulfate. The dry methylene chloride extract was filtered and solvent removed by rotary evaporation under vacuum. The diphenol cyanate mixture was recovered (229.7 grams) as a white-colored solid at room temperature (25° C.). Infrared spectrophotometric analysis demonstrated the presence of the cyanate functionality as well as unreacted hydroxyl functionality. Liquid chromatographic analysis demonstrated the presence of 55.82 area percent bisphenol A, 37.89 area percent bisphenol A monocyanate, and 6.29 area percent bisphenol A dicyanate.

B. Trimerization of Diphenol Cyanate Mixture

The diphenol cyanate mixture (229.7 grams) from A above and 6.0 percent cobalt naphthenate (0.10 percent by weight, 0.23 gram) were thoroughly mixed and placed in a glass tray. The tray was then placed in a forced-air, convection-type oven and maintained for 1.25 hours (4500 s) at 177° C. The hydroxyaromatic oligomers containing triazine groups were recovered in quantitative yield as a transparent, brittle solid at room temperature (25° C.). The oligomers had a greenish-colored cast due to the catalyst. At the 177° C. temperature, the oligomers were still totally fluid. Infrared spectrophotometric analysis demonstrated complete disappearance of the cyanate functionality, appearance of the triazine functionality, and the presence of unreacted hydroxyl functionality.

C. Epoxidation of Hydroxy Aromatic Oligomers Containing Triazine Groups

A portion (215.00 grams) of the hydroxyaromatic oligomers containing triazine groups from B above, epichlorohydrin (6.865 moles, 635.22 grams), isopropanol (35 percent by weight of epichlorohydrin used, 324.04 grams), and water (8 percent by weight of epichlorohydrin used, 55.24 grams) were added to a reactor and stirred under a nitrogen atmosphere at 60° C. until a solution was formed. At this time, the reactor was cooled to 50° C. and dropwise addition of a sodium hydroxide (2.4714 moles, 98.86 grams) solution in water (395.42 grams) commenced and was completed over the next 45 minutes (2700 s). During this sodium hydroxide addition, the reaction temperature was allowed to increase to 60° C. and was then held at this temperature. Fifteen minutes (900 s) after the addition of sodium hydroxide solution, a second solution of sodium hydroxide (1.0984 moles, 43.94 grams) in water (175.76 grams) was added dropwise to the reactor over the next 20 minutes (1200 s). Fifteen minutes (900 s) later, the reactor was cooled to 40° C. then an initial water wash (400 grams) was added to the reactor. The reactor contents were transferred to a separatory funnel containing additional epichlorohydrin (200 grams). The water wash layer was separated and discarded while the organic layer was added back into the separatory funnel along with a second water wash (200 grams). The organic layer was separated then added back into the separatory funnel along with a third water wash (200 grams). The water wash layer was separated and discarded while the organic layer was added back into the separatory funnel with a final water wash (1000 grams). Epichlorohydrin (200 grams) was added to the separatory funnel, then the water wash layer was separated and discarded. The recovered organic layer was stripped of solvents by rotary evaporation at 100° C. for 30 minutes (1800 s) under vacuum. The epoxy resin was recovered (272.4 grams) as a transparent, light yellow-colored liquid at room temperature (25° C.). Infrared spectrophotometric analysis demonstrated substantially complete disappearance of hydroxyl functionality, appearance of epoxide functionality and presence of triazine functionality. Epoxide titration revealed the presence of 21.55 percent by weight epoxide.

COMPARATIVE EXPERIMENT 2 (U.S. Pat. No. 4,489,202)

A portion of the epoxy resin of Comparative Experiment 1-C (265.00 grams) was heated to 75° C. then 4,4′-diaminodiphenyl methane (65.74 grams) was added and thoroughly mixed in. This solution was used to prepare a clear, unfilled ⅛ inch (0.3175 cm) casting for heat distortion temperature (264 psi, 1820 kPa), tensile and flexural strength, flexural modulus, percent elongation and average Barcol hardness (934-1 scale) determinations. The casting was cured for 2 hours (7200 s) at 75° C. followed by post curing of 2 hours (7200 s) at 125° C., 2 hours (7200 s) at 175° C., then 2 hours (7200 s) at 200° C. Mechanical properties were evaluated using the method of Example 2. The results are reported in Table I.

COMPARATIVE EXPERIMENT 3 (U.S. Pat. No. 4,487,915)

A. Preparation of Diphenol Cyanate Mixture

Cyanogen bromide (0.55 moles, 58.26 grams) was added to a reactor containing stirred acetone (175 milliliters) under a nitrogen atmosphere. The cyanogen bromide-acetone solution was cooled to −3° C., then Bisphenol A (1.00 mole, 228.30 grams) dissolved in chilled acetone (650 milliliters) was added to the reactor. The stirred solution was allowed to equilibrate at −3° C., then triethylamine (0.50 mole, 50.60 grams) was added to the reactor over a thirty minute (1800 s) period so as to maintain the reaction temperature at −5° to 0° C. After completion of the triethylamine addition, the reactor was maintained at 0° to 7° C. for an additional 20 minutes (1200 s), followed by addition of the reaction product to chilled water (1 gallon, 3078 ml) with agitation. After 15 minutes (900 s), the water and product mixture was multiply extracted with methylene chloride (400 milliliters total). The combined methylene chloride extracts were washed 5 percent hydrochloric acid (500 milliliters), then water (800 milliliters), and then dried over anhydrous sodium sulfate. The dry methylene chloride extract was filtered and solvent removed by rotary evaporation under vacuum. The diphenol cyanate mixture was recovered (234.12 grams) as a white-colored solid at room temperature (25° C.). Infrared spectrophotometric analysis demonstrated the presence of the cyanate functionality as well as unreacted hydroxyl functionality. Liquid chromatographic analysis demonstrated the presence of 67.2 area percent Bisphenol A, 29.9 area percent Bisphenol A monocyanate, and 2.9 area percent Bisphenol A dicyanate.

B. Co-oligomerization of Diphenol Cyanate Mixture and an Epoxy Resin

A portion of the diphenol cyanate mixture (230.3 grams) from A above, an epoxy resin (10.79 grams) and 6.0 percent cobalt naphthenate (0.10 percent by weight, 0.24 gram) were thoroughly mixed and placed in a glass tray. The epoxy resin had an epoxide equivalent weight (EEW) of 337.8 and was prepared by reaction of Bisphenol A diglycidyl ether, EEW = 183, (0.40 mole, 146.4 grams) with Bisphenol A (0.20 mole, 45.66 grams) and benzyl trimethylammonium chloride catalyst 60 percent aqueous, (0.19 gram) at 120° C. for 50 minutes (3000 s). The tray was then placed in a forced-air, convection-type oven and maintained for 1.25 hours (4500 s) at 177° C. The hydroxyaromatic co-oligomerization product containing triazine and oxazoline groups was recovered in quantitative yield as a transparent, light amber-colored, brittle solid at room temperature (25° C.). Infrared spectrophotometric analysis demonstrated complete disappearance of the cyanate functionality, appearance of the triazine functionality, appearance of the oxazoline functionality and the presence of unreacted hydroxyl functionality.

C. Epoxidation of Hydroxyaromatic Co-oligomerization Product Containing Triazine and Oxazoline Groups A portion of the hydroxyaromatic co-oligomerization product containing triazine and oxazoline groups (215.0 grams), epichlorohydrin (7.602 moles, 703.41 grams), isopropanol (35 percent by weight of epichlorohydrin used, 378.76 grams), and water (8 percent by weight of epichlorohydrin used, 61.16 grams) were added to a reactor and stirred under a nitrogen atmosphere at 50° C. until a solution was formed. At that time, dropwise addition of a sodium hydroxide (2.74 moles, 109.47 grams) solution in water (437.88 grams) commenced and was completed over the next 45 minutes (2700 s). During this sodium hydroxide addition, the reaction temperature was allowed to increase to 60° C. and was then held at this temperature. Fifteen minutes (900 s) after the addition of sodium hydroxide solution, a second solution of sodium hydroxide (1.22 mole, 48.65 grams) in water (194.61 grams) was added dropwise to the reactor over the next 20 minutes (1200 s). Fifteen minutes (900 s) later, the reactor was cooled to 40° C., then an initial water wash (400 milliliters) was added to the reactor. The reactor contents were transferred to a separatory funnel containing additional epichlorohydrin (200 milliliters). The water wash layer was separated and discarded while the organic layer was added back into the separatory funnel along with a second water wash (200 milliliters). The organic layer was separated then added back into the separatory funnel along with a third water wash (800 milliliters) and additional epichlorohydrin (200 milliliters). The recovered organic layer was stripped of solvents by rotary evaporation at 100° C. for 30 minutes (1800 s) under vacuum. The epoxy resin was recovered (301.91 grams) as a transparent, light amber-colored liquid at room temperature (25° C.). Infrared spectrophotometric analysis demonstrated substantially complete disappearance of hydroxyl functionality, appearance of epoxide functionality and presence of both triazine and oxazoline functionalities. Epoxide titration revealed the presence of 20.82 percent by weight epoxide.

COMPARATIVE EXPERIMENT 4 (U.S. Pat. No. 4,487,915)

A portion of the epoxy resin of Comparative Experiment 3-C (285.0 grams) was heated to 75° C., then 4,4'-diaminodiphenyl methane (68.31 grams) was added and thoroughly mixed in. This solution was used to prepare a clear, unfilled one-eighth inch (0.3175 cm) casting for heat distortion temperature (264 psi, 1820 kPa), tensile and flexural strength, flexural modulus, percent elongation and average Barcol hardness (934-1 scale) determinations. The casting was cured for 2 hours (7200 s) at 75° C., followed by post-curing for 2 hours (7200 s) at 125° C., 2 hours (7200 s) at 175° C., then 2 hours (7200 s) at 200° C. Mechanical properties were evaluated using the method of Example 2. The results are reported in Table I.

EXAMPLE 3

The hydroxyaromatic oligomers containing triazine groups and imino carbamate linkages from Example 1-B were analyzed by gel permeation chromatography using polystyrene standards. The gel permeation chromatographic analysis revealed a bimodal weight distribution with one peak possessing a weight average molecular weight of 3224 and a polydispersity ratio of 1.24 and a second peak possessing a weight average molecular weight of 1296 and a polydispersity ratio of 1.04.

TABLE I

| | Example 2 | Comp. Expt. 2 | Comp. Expt. 2 |
|---|---|---|---|
| Barcol Hardness | 35 | 42 | 40 |
| Heat Distortion Temperature °F./°C. | 303.8/151 | 307/152.75 | 296/147 |
| Tensile Strength, psi | 12,985 | 10,694 | 12,593 |
| kPa | 89,529 | 73,733 | 86,826 |
| Elongation (%) | 10.48 | 3.69 | 5.36 |
| Flexural Strength, psi | 22,052 | 21,709 | 23,081 |
| kPa | 152,044 | 149,679 | 159,139 |
| Flexural Modulus, psi | 449,000 | 519,000 | 512,000 |
| kPa | 3,095,765 | 3,578,401 | 3,530,138 |

EXAMPLE 4

Epoxy Resin Advancement with Hydroxyaromatic Oligomers Containing Triazine Groups and Imino Carbamate Linkages A portion (62.02 grams, 0.40 hydroxyl equivalent) of hydroxyaromatic oligomers containing triazine groups and imino carbamate linkages from Example 1-B, a diglycidyl ether of bisphenol A (435.67 grams, 2.40 equivalent) having an epoxide equivalent weight (EEW) of 181.5 and 60 percent aqueous benzyltrimethylammonium chloride (0.498 gram) catalyst were added to a reactor and heated to 120° C. with stirring under a nitrogen atmosphere. After 60 minutes (3600 s) at the 120° C. reaction temperature, the reactor was cooled and the epoxy resin advanced with oligomers containing triazine groups and imino carbamate linkages was recovered as a transparent, light yellow colored liquid. Epoxide titration revealed the resin to contain 16.70 percent epoxide (257.5 EEW).

EXAMPLE 5

Preparation of Cured Advanced Epoxy Resin

A portion of the epoxy resin of Example 4 (230.0 grams) was heated to 100° C., then 4,4'-diaminodiphenyl methane (44.22 grams) was added and thoroughly mixed in. This solution was used to prepare a clear, unfilled one-eighth inch (0.3175 cm) casting using the method of Example 2. Mechanical properties were evaluated using the method of Example 2. The results are reported in Table II.

COMPARATIVE EXPERIMENT 5 (Allowed application Ser. No. 582,415)

Epoxy Resin Advancement with Hydroxyaromatic Oligomers Containing Triazine Groups A portion (31.84 grams, 0.20 mole hydroxyl equivalent) of hydroxyaromatic oligomers containing triazine groups prepared using the method of Comparative Experiment 1-B, a diglycidyl ether of bisphenol A (219.60 grams, 1.20 equivalent) having an EEW of 183 and 60 percent aqueous benzyltrimethylammonium chloride (0.251 gram) catalyst were added to a reactor and heated to 120° C. with stirring under a nitrogen atmosphere. After 60 minutes (2600 s) at the 120° C. reaction temperature, the reactor was cooled and the epoxy resin advanced with triazine functional oligomers was recovered as a transparent yellow colored liquid. Epoxide titration revealed 15.38 percent epoxide in the resin.

COMPARATIVE EXPERIMENT 6 (Allowed application Ser. No. 582,415)

A portion of the epoxy resin of Comparative Experiment 5 (241.13 grams) was heated to 100° C., then 4,4'-diaminodiphenyl methane (41.45 grams) was added and thoroughly mixed in. This solution was used to prepare a clear, unfilled one-eighth inch (0.3175 cm) casting using the method of Example 2. Mechanical properties were evaluated using the method of Example 2. The results are reported in Table II.

COMPARATIVE EXPERIMENT 7 (Allowed application Ser. No. 582,415)

Epoxy Resin Advancement with Hydroxyaromatic Oligomers Containing Triazine and Oxazoline Groups A portion (33.24 grams, 0.20 mole hydroxyl equivalent) of hydroxyaromatic oligomers containing triazine and oxazoline groups prepared using the method of Comparative Experiment 3-B, a diglycidylether of bisphenol A (219.60 grams, 1.20 equivalent) having an EEW of 183 and 60 percent aqueous benzyltrimethylammonium chloride (0.253 gram) catalyst were added to a reactor and heated to 120° C. with stirring under a nitrogen atmosphere. After 60 minutes (3600 s) at the 120° C. reaction temperature, the reactor was cooled and the epoxy resin advanced with triazine and oxazoline functional oligomers was recovered as a transparent, yellow colored liquid. Epoxide titration revealed 15.32 percent epoxide in the resin.

COMPARATIVE EXPERIMENT 8 (Allowed application Ser. No. 582,415)

A portion of the epoxy resin of Comparative Experiment 7 (238.64 grams) was heated to 100° C., then 4,4'-diaminodiphenyl methane (42.09 grams) was added and thoroughly mixed in. This solution was used to prepare a clear, unfilled one-eighth inch (0.3175 cm) casting using the method of Example 2. Mechanical properties were evaluated using the method of Example 2. The results are reported in Table II.

TABLE II

|  | Example 5 | Comp. Expt. 6 | Comp. Expt. 8 |
| --- | --- | --- | --- |
| Barcol Hardness | 32 | 38 | 40 |
| Heat Distortion Temperature °F./°C. | 288.5/142.5 | 297.5/147.5 | 294.8/146 |
| Tensile Strength, psi | 11,776 | 11,289 | 10,498 |
| kPa | 81,193 | 81,559 | 72,382 |
| Elongation (%) | 8.22 | 5.69 | 4.30 |
| Flexural Strength, psi | 19,352 | 21,415 | 21,680 |
| kPa | 133,428 | 147,652 | 149,479 |
| Flexural Modulus, psi | 394,000 | 421,000 | 409,000 |
| kPa | 2,716,551 | 2,901,000 | 2,818,000 |

EXAMPLE 6

Infrared Spectrophotometric Analysis of Hydroxyaromatic Co-oligomerization Product Containing Triazine Groups and Imino Carbamate Linkages A portion of the co-oligomerization product from Example 1-B and a portion of a co-oligomerization product prepared by reacting 1.00 gram of cyanate mixture (57.06 area percent bisphenol A, 37.17 area percent bisphenol A monocyanate, 5.77 area percent bisphenol A dicyanate) and 0.1866 gram of 4,4'-diaminodiphenyl methane (methylenedianiline) using the method of Example 1-B, except that no cobalt naphthenate catalyst was employed, were analyzed by infrared spectroscopy.

In both co-oligomerization products, the absorbance due to the cyanate group was gone while a strong hydroxyl group absorbance due to phenolic hydroxyl groups was present. The co-oligomerization product from Example 1-B exhibited triazine absorbances (1565 cm$^{-1}$ and 1380 cm$^{-1}$) and a shoulder between 1678–1620 cm$^{-1}$ which is assigned to

absorbance of the imino carbamate group. The co-oligomerization product prepared herein possessed only a trace of triazine absorbance and a shoulder between 1710–1620 cm$^{-1}$. These results clearly demonstrate increased conversion of cyanate groups to a functionality other than the triazine group (proposed to be the imino carbamate linkage) as a function of increasing amino group concentration used to prepare the co-oligomerization product.

EXAMPLE 7

A sample (9.18 milligrams) of the clear, unfilled casting of Example 2 was analyzed by thermogravimetric analysis (TGA) using a nitrogen flow rate of 35 cubic centimeters per minute (0.58 cc/s) and a rate of temperature increase of 10° C. per minute (0.167° C./s). The weight of the sample as a function of temperature is reported in Table III.

COMPARATIVE EXPERIMENT 9

A sample (14.98 milligrams) of the clear, unfilled casting of Comparative Experiment 2 was analyzed by TGA using the method of Example 7. The weight of the sample as a function of temperature is reported in Table III.

COMPARATIVE EXPERIMENT 10

A sample (9.56 milligrams) of the clear, unfilled casting of Comparative Experiment 4 was analyzed by TGA using the method of Example 7. The weight of the sample as a function of temperature is reported in Table III.

TABLE III

| Temperature (°C.) | Percent of Original Weight | | |
|---|---|---|---|
| | Example 7 | Comp. Expt. 9 | Comp. Expt. 10 |
| 200 | 98.9 | 99.6 | 99.5 |
| 250 | 98.6 | 99.2 | 99.2 |
| 300 | 98.2 | 98.9 | 98.8 |
| 350 | 96.3 | 97.0 | 98.2 |
| 400 | 60.8 | 66.8 | 95.0 |
| 450 | 25.7 | 31.4 | 43.2 |

I claim:

1. Hydroxyaromatic oligomer compositions containing both triazine groups and imino carbamate linkages prepared by
    (I) reacting at a temperature and time sufficient to essentially complete the reaction
        (A) at least one material having an average of more than one aromatic hydroxyl group per molecule with
        (B) at least 0.01 but not more than 0.95 moles of at least one cyanogen halide per aromatic hydroxyl group in the presence of
        (C) from about 0.01 to about 1.1 moles of a suitable base per aromatic hydroxyl group
    and thereafter recovering the resultant cyanate-containing mixture; and
    (II) co-oligomerizing the product resulting from (I) with
        (D) an aromatic polyamine in an amount which provides a mole ratio of amine groups to cyanate groups of from about 0.01:1 to about 1:1 optionally
    in the presence of
        (E) a suitable co-oligomerization catalyst and at a temperature and time to essentially complete the co-oligomerization reaction.

2. A hydroxyaromatic oligomer composition of claim 1 wherein
    (i) component (A) is represented by the formula

II.

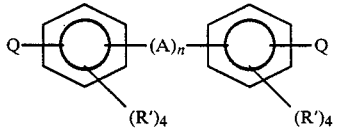

wherein each A is independently a divalent hydrocarbon group having from 1 to about 12, carbon atoms,

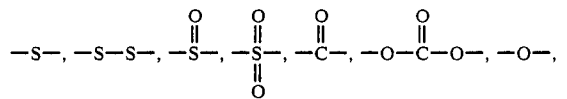

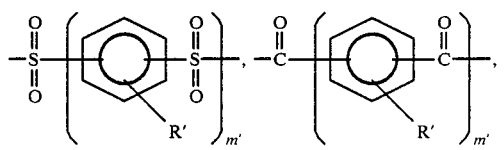

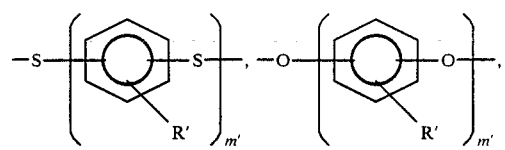

and the like; each R' is independently hydrogen or a hydrocarbyl or hydrocarbyloxy group having from 1 to about 6 carbon atoms or a halogen; Q is a hydroxyl group; m' has a value from 1 to about 100; and n has a value of zero or 1;
    (ii) component (C) is a tertiary amine;
    (iii) component (D) is represented by formula II above wherein each Q is an —NH$_2$ group and A, R' and n are as defined above;
    (iv) components (A) and (B) are present in quantities which provide a ratio of moles of cyanogen halide per aromatic hydroxyl group of from about 0.05:1 to about 0.55:1;
    (v) component (C) is present in a quantity which provides a ratio of moles of component (B) per aromatic hydroxyl group of from about 0.05:1 to about 0.6:1; and
    (vi) component (D) is present in a quantity which provides a ratio of amine groups to cyanate groups of from about 0.03:1 to about 0.20:1.

3. A composition of claim 2 wherein
    (i) component (A) is bisphenol A;
    (ii) component (B) is cyanogen bromide; and
    (iii) component (D) is 4,4'-diaminodiphenyl methane.

4. An epoxy resin composition prepared by reacting an epihalohydrin with a hydroxyaromatic oligomer containing at least one triazine group and at least one imino carbamate linkage of claims 1, 2 or 3 and subsequently dehydrohalogenating the resultant halohydrin ether and thereafter recovering the resultant glycidyl ether product.

5. An advanced epoxy resin composition prepared by reacting
    (A) at least one hydroxyaromatic oligomer containing at least one triazine group and at least one imino carbamate linkage of claims 1, 2 or 3 with
    (B) at least one material having an average of more than one 1,2-epoxy group per molecule;
wherein components (A) and (B) are employed in proportions which provide a ratio of hydroxyl groups to epoxy groups of from about 0.1:1 to about 1:1.

6. An advanced epoxy resin of claim 5 wherein
    (i) component (B) is a material represented by the formula

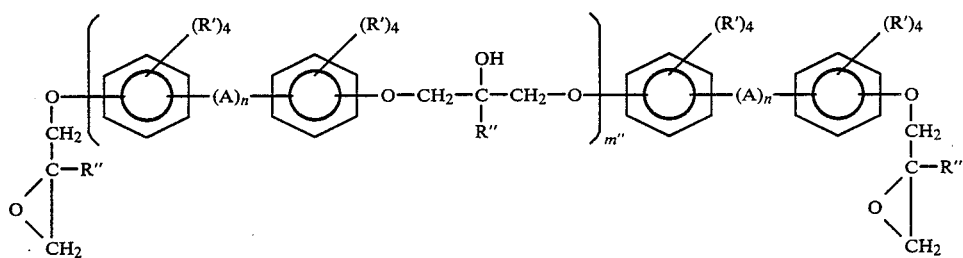

wherein each A is independently a divalent hydrocarbon group having from 1 to about 12, carbon atoms,

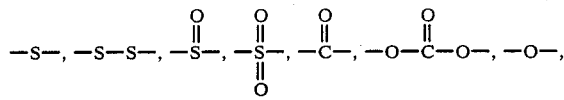

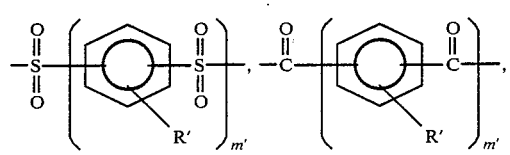

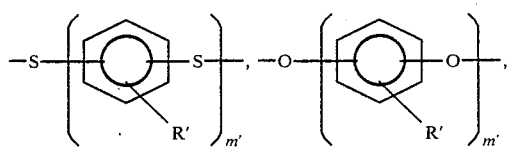

and the like; each R' is independently hydrogen or a hydrocarbyl or hydrocarbyloxy group having from 1 to about 6 carbon atoms or a halogen; each R" is hydrogen or a hydrocarbyl group having from 1 to about 3 carbon atoms; m' has a value from 1 to about 100; m" has a value from about zero to about 40; and n has a value of zero or 1; and (ii) components (A) and (B) are present in quantities which provide a ratio of hydroxyl groups to epoxy groups of from about 0.1:1 to about 0.5:1.

7. An advanced epoxy resin of claim 6 wherein in component (B) A is an isopropylidene group; R" is hydrogen; m" has a value of from about 0.1 to about 5; and n has a value of 1.

8. The product resulting from curing the epoxy resin of claim 4 with a curing quantity of a suitable curing agent or curing catalyst or combination 9. The product resulting from curing the advanced epoxy resin of claim 5 with a curing quantity of a suitable curing agent or curing catalyst or combination thereof.

10. The product resulting from curing the advanced epoxy resin of claim 6 with a curing quantity of a suitable curing agent or curing catalyst or combination thereof.

11. The product resulting from curing the advanced epoxy resin of claim 7 with a curing quantity of a suitable curing agent or curing catalyst or combination thereof.

* * * * *

UNITED STATES PATENT AND TRADEMARK OFFICE
CERTIFICATE OF CORRECTION

PATENT NO. : 4,555,553

DATED : November 26, 1985

INVENTOR(S) : Robert E. Hefner, Jr.

It is certified that error appears in the above-identified patent and that said Letters Patent is hereby corrected as shown below:

Col. 4, line 37; change "N'" to --n'--.

Col. 9, line 50; delete the second occurrence of "and".

Col. 14, line 45, Table I; change the second occurrence of "Expt. 2" to --Expt. 4--.

Col. 15, line 33; change "(2600" to --(3600--.

Col. 16, line 18, Table II; under Comp. Expt. 6, change "11,289" to --11,829--.

Col. 20, line 26, Claim 8; insert --thereof-- after "combination".

Col. 18, line 39, Claim 2; change "(B)" to --(C)--.

Signed and Sealed this

Twenty-ninth Day of July 1986

[SEAL]

Attest:

DONALD J. QUIGG

Attesting Officer

Commissioner of Patents and Trademarks